United States Patent
Hsiao et al.

(10) Patent No.: US 11,470,356 B2
(45) Date of Patent: Oct. 11, 2022

(54) METHOD AND APPARATUS OF NEURAL NETWORK FOR VIDEO CODING

(71) Applicant: MEDIATEK INC., Hsinchu (TW)

(72) Inventors: Yu-Ling Hsiao, Hsinchu (TW); Yu-Chi Su, Hsinchu (TW); Jan Klopp, Hsinchu (TW); Ching-Yeh Chen, Hsinchu (TW); Tzu-Der Chuang, Hsinchu (TW); Chih-Wei Hsu, Hsinchu (TW); Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/047,244

(22) PCT Filed: Apr. 16, 2019

(86) PCT No.: PCT/CN2019/082879
§ 371 (c)(1),
(2) Date: Oct. 13, 2020

(87) PCT Pub. No.: WO2019/201239
PCT Pub. Date: Oct. 24, 2019

(65) Prior Publication Data
US 2021/0168405 A1   Jun. 3, 2021

Related U.S. Application Data

(60) Provisional application No. 62/722,231, filed on Aug. 24, 2018, provisional application No. 62/658,643, filed on Apr. 17, 2018.

(51) Int. Cl.
*H04N 19/70* (2014.01)
*H04N 19/82* (2014.01)
*G06N 3/04* (2006.01)

(52) U.S. Cl.
CPC ............. *H04N 19/70* (2014.11); *G06N 3/04* (2013.01); *H04N 19/82* (2014.11)

(58) Field of Classification Search
CPC ...... G06N 3/04; G06N 3/0445; G06N 3/0454; G06N 3/0472; G06N 3/084; H04N 19/70; H04N 19/82
See application file for complete search history.

(56) References Cited

U.S. PATENT DOCUMENTS

| 8,014,651 B2 | 9/2011 | Campisano et al. |
| 9,479,786 B2 | 10/2016 | Lu et al. |

(Continued)

FOREIGN PATENT DOCUMENTS

| CN | 104768011 A | 7/2015 |
| CN | 107396124 A | 11/2017 |

(Continued)

OTHER PUBLICATIONS

International Search Report and Written Opinion dated Jul. 2, 2019, issued in application No. PCT/CN2019/082879.

(Continued)

*Primary Examiner* — Anner N Holder
(74) *Attorney, Agent, or Firm* — McClure, Qualey & Rodack, LLP (57) ABSTRACT

A method and apparatus of video encoding video coding for a video encoder or decoder using Neural Network (NN) are disclosed. According to this method, the multiple frames in a video sequence comprises multiple segments, where each of the multiple segments comprises a set of frames. The NN (Neural Network) processing is applied to a target signal in one or more encoded frames of a target segment in the encoder side or to the target signal in one or more decoded frames of the target segment in the decoder side using one NN parameter set for the target segment. The target signal (Continued)

may correspond to reconstructed residual, reconstructed output, de-blocked output, SAO (sample adaptive offset) output, ALF (adaptive loop filter) output, or a combination thereof. In another embodiment, the NN processing is applied to a target signal only in one or more specific encoded or decoded frames.

20 Claims, 5 Drawing Sheets

(56) References Cited

U.S. PATENT DOCUMENTS

| | | | |
|---|---|---|---|
| 10,341,670 B1* | 7/2019 | Brailovskiy | H04N 19/192 |
| 10,681,380 B2 | 6/2020 | Terada et al. | |
| 2013/0107958 A1* | 5/2013 | Shimada | H04N 19/593 |
| | | | 375/240.15 |
| 2013/0294500 A1* | 11/2013 | Wang | H04N 19/70 |
| | | | 375/240.02 |
| 2015/0237351 A1 | 8/2015 | Lee et al. | |
| 2016/0379112 A1* | 12/2016 | He | G06N 3/0454 |
| | | | 706/25 |
| 2018/0014012 A1* | 1/2018 | Yu | H04N 19/503 |
| 2018/0025257 A1 | 1/2018 | van den Oord et al. | |
| 2018/0124414 A1* | 5/2018 | Van Leuven | H04N 19/30 |
| 2018/0124422 A1* | 5/2018 | Van Leuven | H04N 19/31 |
| 2018/0204314 A1* | 7/2018 | Kaplanyan | G06T 1/20 |
| 2018/0324454 A1* | 11/2018 | Lin | H04N 19/159 |
| 2018/0352247 A1* | 12/2018 | Park | H04N 19/513 |
| 2018/0359470 A1* | 12/2018 | Lee | H04N 19/176 |
| 2019/0138838 A1* | 5/2019 | Liu | G06T 11/00 |

FOREIGN PATENT DOCUMENTS

| | | |
|---|---|---|
| CN | 107736027 A | 2/2018 |
| TW | I268710 B | 12/2006 |
| TW | I569629 B | 2/2017 |

OTHER PUBLICATIONS

Chinese language office action dated Jul. 24, 2020, issued in application No. 108113357.

* cited by examiner

METHOD AND APPARATUS OF NEURAL NETWORK FOR VIDEO CODING

CROSS REFERENCE TO RELATED APPLICATIONS

The present invention claims priority to U.S. Provisional Patent Application, Ser. No. 62/658,643, filed on Apr. 17, 2018 and U.S. Provisional Patent Application, Ser. No. 62/722,231, filed on Aug. 24, 2018. The U.S. Provisional Patent Applications are hereby incorporated by reference in their entireties.

FIELD OF THE INVENTION

The invention relates generally to video coding. In particular, the present invention relates to applying Neural Network (NN) in the coding system to one or more target signals in encoded or decoded frames, where the video sequence is divided into segments and different NN parameter sets may be used for these segments.

BACKGROUND AND RELATED ART

Neural Network (NN), also referred as an 'Artificial' Neural Network (ANN), is an information-processing system that has certain performance characteristics in common with biological neural networks. A Neural Network system is made up of a number of simple and highly interconnected processing elements to process information by their dynamic state response to external inputs. The processing element can be considered as a neuron in the human brain, where each perceptron accepts multiple inputs and computes weighted sum of the inputs. In the field of neural network, the perceptron is considered as a mathematical model of a biological neuron. Furthermore, these interconnected processing elements are often organized in layers. For recognition applications, the external inputs may correspond to patterns are presented to the network, which communicates to one or more middle layers, also called 'hidden layers', where the actual processing is done via a system of weighted 'connections'.

Artificial neural networks may use different architecture to specify what variables are involved in the network and their topological relationships. For example the variables involved in a neural network might be the weights of the connections between the neurons, along with activities of the neurons. Feed-forward network is a type of neural network topology, where nodes in each layer are fed to the next stage and there is connection among nodes in the same layer. Most ANNs contain some form of 'learning rule', which modifies the weights of the connections according to the input patterns that it is presented with. In a sense, ANNs learn by example as do their biological counterparts. Backward propagation neural network is a more advanced neural network that allows backwards error propagation of weight adjustments. Consequently, the backward propagation neural network is capable of improving performance by minimizing the errors being fed backwards to the neural network.

The NN can be a deep neural network (DNN), convolutional neural network (CNN), recurrent neural network (RNN), or other NN variations. Deep multi-layer neural networks or deep neural networks (DNN) correspond to neural networks having many levels of interconnected nodes allowing them to compactly represent highly non-linear and highly-varying functions. Nevertheless, the computational complexity for DNN grows rapidly along with the number of nodes associated with the large number of layers.

The CNN is a class of feed-forward artificial neural networks that is most commonly used for analyzing visual imagery. A recurrent neural network (RNN) is a class of artificial neural network where connections between nodes form a directed graph along a sequence. Unlike feedforward neural networks, RNNs can use their internal state (memory) to process sequences of inputs. The RNN may have loops in them so as to allow information to persist. The RNN allows operating over sequences of vectors, such as sequences in the input, the output, or both.

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC).

In HEVC, one slice is partitioned into multiple coding tree units (CTU). The CTU is further partitioned into multiple coding units (CUs) to adapt to various local characteristics. HEVC supports multiple Intra prediction modes and for Intra coded CU, the selected Intra prediction mode is signaled. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. After prediction, the residues associated with the CU are partitioned into transform blocks, named transform units (TUs) for the transform process.

Figure 1A:
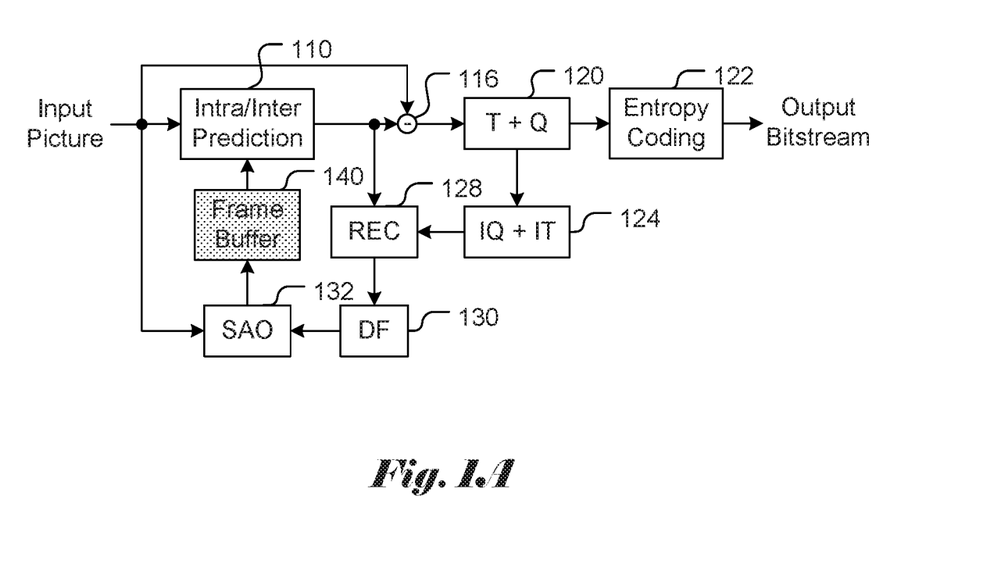
FIG. 1A illustrates an exemplary adaptive Intra/Inter video encoder based on the High Efficiency Video Coding (HEVC) standard.

FIG. 1A illustrates an exemplary adaptive Intra/Inter video encoder based on HEVC. The Intra/Inter Prediction unit 110 generates Inter prediction based on Motion Estimation (ME)/Motion Compensation (MC) when Inter mode is used. The Intra/Inter Prediction unit 110 generates Intra prediction when Intra mode is used. The Intra/Inter prediction data (i.e., the Intra/Inter prediction signal) is supplied to the subtractor 116 to form prediction errors, also called residues or residual, by subtracting the Intra/Inter prediction signal from the signal associated with the input picture. The process of generating the Intra/Inter prediction data is referred as the prediction process in this disclosure. The prediction error (i.e., residual) is then processed by Transform (T) followed by Quantization (Q) (T+Q, 120). The transformed and quantized residues are then coded by Entropy coding unit 122 to be included in a video bitstream corresponding to the compressed video data. The bitstream associated with the transform coefficients is then packed with side information such as motion, coding modes, and other information associated with the image area. The side information may also be compressed by entropy coding to reduce required bandwidth. Since a reconstructed picture may be used as a reference picture for Inter prediction, a reference picture or pictures have to be reconstructed at the encoder end as well. Consequently, the transformed and quantized residues are processed by Inverse Quantization (IQ) and Inverse Transformation (IT) (IQ+IT, 124) to recover the residues. The reconstructed residues are then added back to Intra/Inter prediction data at Reconstruction unit (REC) 128 to reconstruct video data. The process of adding the reconstructed residual to the Intra/Inter prediction signal is referred as the reconstruction process in this disclosure. The output picture from the reconstruction process is referred as the reconstructed picture. In order to reduce artefacts in the reconstructed picture, in-loop filters including Deblocking Filter (DF) 130 and Sample Adaptive Offset (SAO) 132 are used. The filtered reconstructed picture at the output of all filtering processes is referred as a decoded picture in this disclosure. The decoded pictures are stored in Frame Buffer 140 and used for prediction of other frames.

Figure 1B:
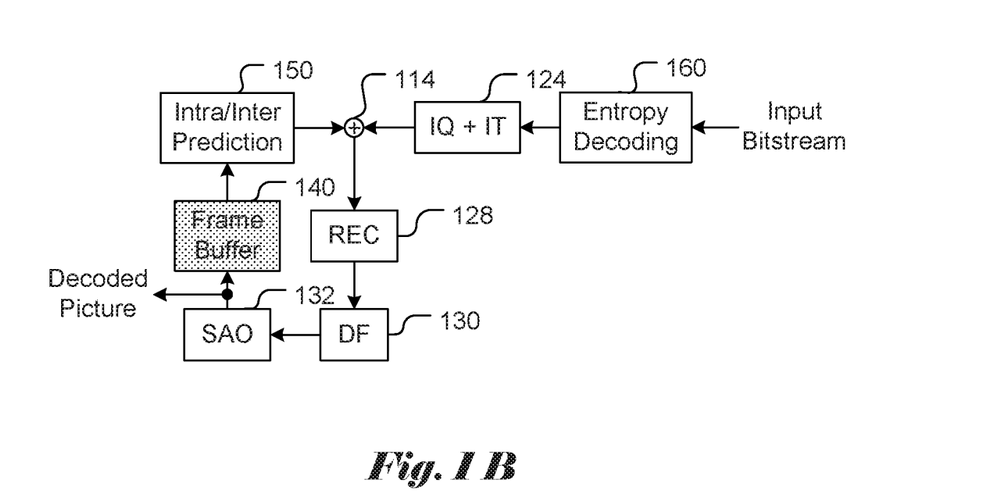
FIG. 1B illustrates an exemplary adaptive Intra/Inter video decoder based on the High Efficiency Video Coding (HEVC) standard.

FIG. 1B illustrates an exemplary adaptive Intra/Inter video decoder based on HEVC. Since the encoder also contains a local decoder for reconstructing the video data, some decoder components are already used in the encoder except for the entropy decoder. At the decoder side, an Entropy Decoding unit 160 is used to recover coded symbols or syntaxes from the bitstream. The process of generating the reconstructed residual from the input bitstream is referred as a residual decoding process in this disclosure. The prediction process for generating the Intra/Inter prediction data is also applied at the decoder side, however, the Intra/Inter prediction unit 150 is different from that in the encoder side since the Inter prediction only needs to perform motion compensation using motion information derived from the bitstream. Furthermore, an Adder 114 is used to add the reconstructed residues to the Intra/Inter prediction data.

Figure 2A:
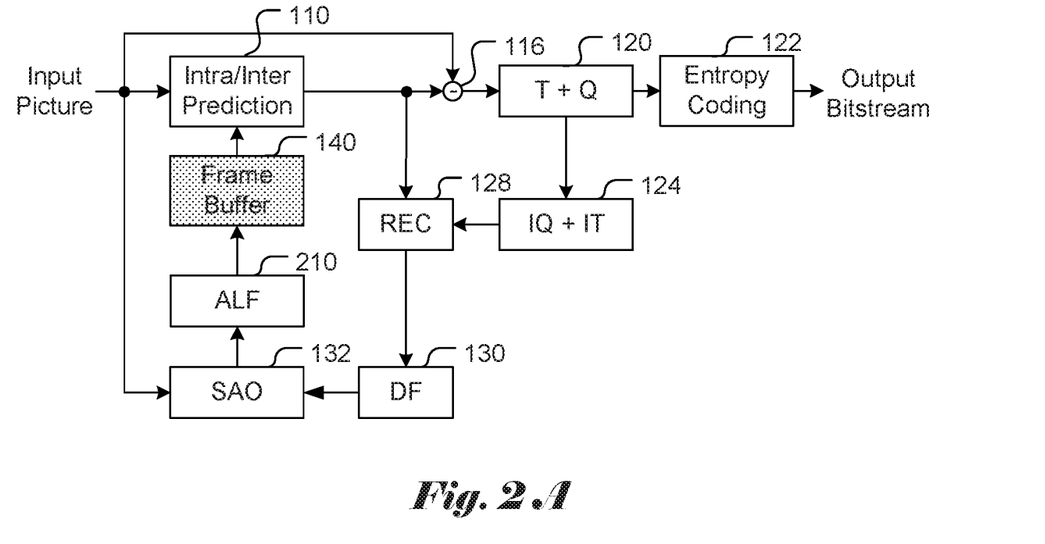
FIG. 2A illustrates an exemplary adaptive Intra/Inter video encoder similar to that in FIG. 1A with an additional ALF process.

During the development of the HEVC standard, another in-loop filter, called Adaptive Loop Filter (ALF), is also disclosed, but not adopted into the main standard. The ALF can be used to further improve the video quality. For example, ALF 210 can be used after SAO 132 and the output from ALF 210 is stored in the Frame Buffer 140 as shown in FIG. 2A for the encoder side and FIG. 2B at the decoder side. For the decoder side, the output from the ALF 210 can also be used as decoder output for display or other processing. In this disclosure, deblocking filter, SAO and ALF are all referred as a filtering process.

Among different image restoration or processing methods, neural network based method, such as deep neural network (DNN) or convolution neural network (CNN), is a promising method in the recent years. It has been applied to various image processing applications such as image denoising, image super-resolution, etc., and it has been proved that DNN or CNN can achieve a better performance compared to traditional image processing methods. Therefore, in the following, we propose to utilize CNN as one image restoration method in one video coding system to improve the subjective quality or coding efficiency. It is desirable to utilize NN as an image restoration method in a video coding system to improve the subjective quality or coding efficiency for emerging new video coding standards such as High Efficiency Video Coding (HEVC).

BRIEF SUMMARY OF THE INVENTION

A method and apparatus of video encoding video coding for a video encoder or decoder using Neural Network (NN) are disclosed. According to this method, the multiple frames in a video sequence comprises multiple segments, where each of the multiple segments comprises a set of frames. The NN (Neural Network) processing is applied to a target signal in one or more encoded frames of a target segment in the encoder side or to the target signal in one or more decoded frames of the target segment in the decoder side using one NN parameter set for the target segment. The target signal may correspond to reconstructed residual, reconstructed output, de-blocked output, SAO (sample adaptive offset) output, ALF (adaptive loop filter) output, or a combination thereof.

Each of the multiple segments may correspond to one random access segment (RAS). The set of frames in each of the multiple segments may correspond to consecutive frame in a display order. The set of frames in each of the multiple segments may also correspond to consecutive frame in a decoding order.

The information of the parameter set for a target segment does not need to be signaled if the NN processing is not applied to the target segment.

In one embodiment, the multiple frames comprises the multiple segments with a same number of frames in each of the multiple frames.

In one embodiment, for the video bitstream corresponding to multiple random access segments, an NN parameter set for a random access segment of the multiple random access segments is switched to a next NN parameter set for a nextrandom access segment of the multiple random access segments after decoding one random access point of the random access segment of the random access segments from the video bitstream.

In another embodiment, an NN parameter set for a random access segment of the multiple random access segments is switched to a next NN parameter set for a nextrandom access segment of the multiple random access segments when a reference frame buffer is reset. The NN processing can be disabled for random access points in the multiple random access segments. Alternatively, the NN processing can be applied to random access points in the multiple random access segments using one or more pre-defined NN parameter sets.

In another method, the NN (Neural Network) processing is applied to a target signal only in one or more specific encoded frames of the video sequence in the encoder side or only in one or more specific decoded frames of the video sequence in the decoder side. The specific frames can be pre-defined. In another embodiment, the specific frames are indicated by one or more syntax elements signaled in a sequence level or a picture level. The specific frames may correspond to reference frame or non-reference frames. The specific frames may correspond to one or more frames with a specific temporal ID or a range of temporal IDs. The specific frames may correspond to frames coded with a specific QP range or with a target slice type. The specific frames may correspond to Inter frames immediately after an I slice.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2B:
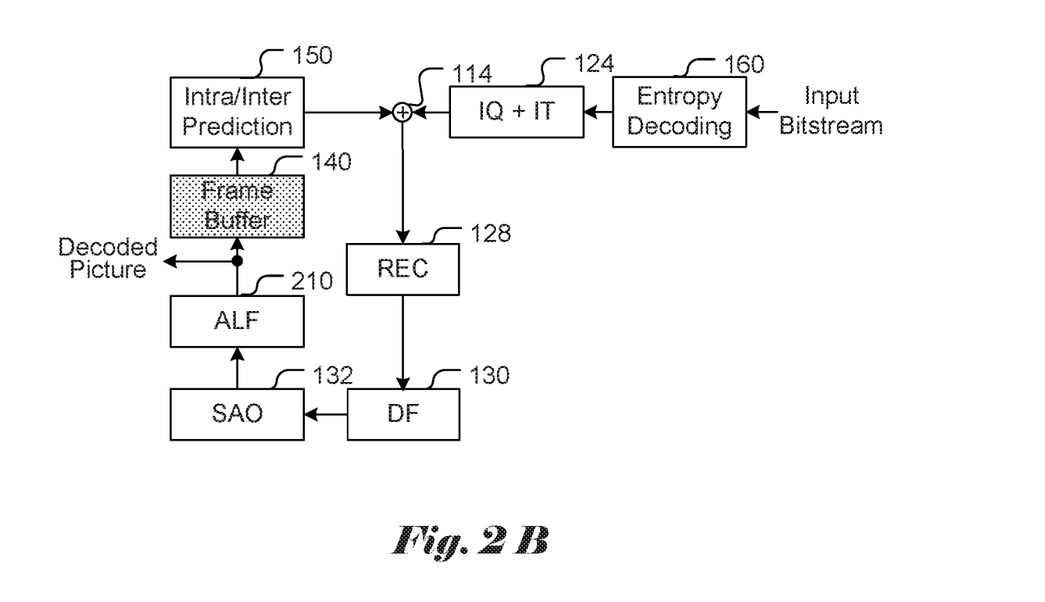
FIG. 2B illustrates an exemplary adaptive Intra/Inter video decoder similar to that in FIG. 1B with an additional ALF process.

One method is disclosed to utilize NN (e.g. CNN) as an image restoration method in a video coding system. For example, as shown in FIGS. 2A and 2B, NN on the target signal, for example, ALF output picture and generate the final decoded picture. Alternatively, the NN can be directly applied to the target signal after SAO, DF, or REC in the video coding system in FIG. 1A/1B or FIG. 2A/2B with or without other restoration methods. In another embodiment, the NN can be used to restore the quantization error directly or only to improve the predictor quality. In the former case, the NN is applied after inverse quantization and transform to restore the reconstructed residual. In the latter case, the NN is applied on the predictors generated by Inter or Intra prediction.

When NN is applied to video coding, different color components can be processed jointly or independently. For example, in one embodiment, different NNs for different color components can be applied independently. Therefore, there can be a total of three NNs for three color components in one video coding system. In another embodiment, there are two NNs in one video coding system, one is designed for the luma component and the other is designed for the chroma component. In the NN designed for the chroma component, U and V can be processed independently or jointly. When U and V are processed independently, the NN outputs one color component at a time and the NN parameters are shared for the U and V components. If U and V can be processed jointly, the inputs of this NN include U and V components and this NN generates U and V data simultaneously. In another embodiment, there is only one NN in the video coding system, where the inputs of NN are three color components at the same time, and the outputs are also three color components.

In another embodiment, the inputs of NN designed for the luma component can be the luma component only or the luma component with corresponding chroma parts. The inputs of NN designed for the chroma component can be the chroma component only or the chroma component with the corresponding luma part. Furthermore, if the YUV sampling ratios are different for different color components, sub-sampling or up-sampling filters can be used to generate the corresponding parts. For example, when the video format is YUV420, the inputs of the NN designed for the luma components include the luma component and the up-sampled chroma data. Alternatively, the inputs of the NN designed for the luma components include the down-sampled luma data and the original chroma data. In the NN designed for the chroma components, the inputs may include two chroma components and the down-sampled luma data.

When one NN processes more than one color component simultaneously, control flags for enabling or disabling the NN for different color components can be combined or shared by these components. For example, if the NN processes two chroma components at the same time, one on/off flag can be coded and shared by the U and V components. In another embodiment, if the NN processes three color components simultaneously, one on/off flag can be coded and shared by three color components.

When the NN is applied to video coding, one color component can be one input component of the NN. Alternative, one color component can be further partitioned into several subblocks and each subblock is one input component of NN. For example, the size of the current region processed by the NN is M×N pixels. If one color component is one input component of NN, the input of NN can be one component with M×N pixels in one embodiment. In another embodiment, the current region can be partitioned into four subblocks with size equal to (M/2)×(N/2), where these subblocks are generated by subsampling with four different phases. In the NN process, each subblock is one kind of input components, so the inputs of NN include four components and the size of each component is only (M/2)×(N/2) pixels.

In some NN architectures, the inputs of the NN designed for the luma component can include the luma component with corresponding chroma parts. The inputs of NN designed for the chroma component can include the chroma component with corresponding luma part. When the YUV sampling ratios are different for different color components, different color components can be processed to cause the block sizes of different input components be equal. For example, when the video format is YUV420, the inputs of the NN designed for the luma component can include the luma component and the chroma components. The luma component is partitioned into four subblocks based on the sampling ratio between the luma and chroma components. Therefore, one subblock of the Y component with the same size as the U or V component is one input component of NN. Therefore, there are four input components for four luma subblocks and two input components for U and V components in the NN designed for the luma component. The sizes of these six input components are the same. If more than one type of data in one color component is used, this proposed method can be applied to all types of data or one of them. For example, for one color component, the predictor, residual, and reconstructed pixels can be used as the inputs of NN. The proposed methods can be used to partition all types of data into four subblocks separately, so that the number of inputs of NN is increased from 3 components with size equal to M×N in one component to 3×4=12 components with size equal to (M/2×N/2) in each component. In another example, only the blocks of one type of data (e.g. the reconstructed pixels) are partitioned into four subblocks and the other two types of data are down-sampled by a factor of two in the horizontal and vertical directions. The number of inputs of NN is then increased from 3 components with size equal to M×N in each component to six components with size equal to (M/2×N/2) in each component.

In the above method, the NN mentioned can be any NN variations, such as CNN (convolutional neural network), DNN (deep fully-connected feed-forward neural network), RNN (recurrent neural network), or GAN (generative adversarial network).

The proposed method in the present invention is to utilize NN as an image restoration method in a video coding system. For example, as shown in FIG. 2A and FIG. 2B, we can apply NN on the ALF output picture to generate the final decoded picture. Alternatively, the NN can be directly applied to the target signal corresponding to the output from REC, DF, or SAO, with or without other restoration methods in the video coding system, as shown in FIGS. 1A-B or FIGS. 2A-B. As mentioned before, the NN can be DNN, CNN, RNN, or other NN variations.

Figure 3:
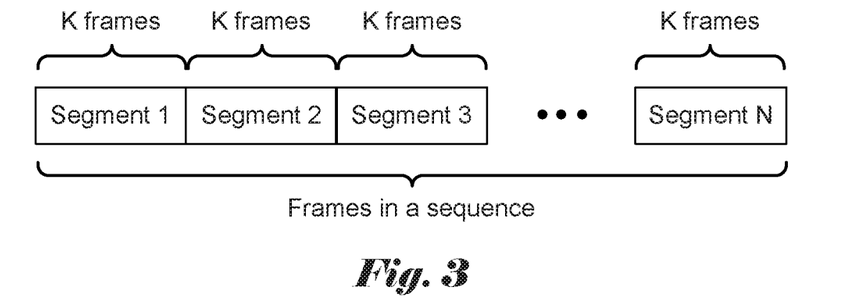
FIG. 3 illustrates the Neural Network (NN) processing according to an embodiment of the present invention, where the frames in a sequence are partitioned into multiple sets, and each set includes K successive frames in the display order for NN processing.
Figure 4:
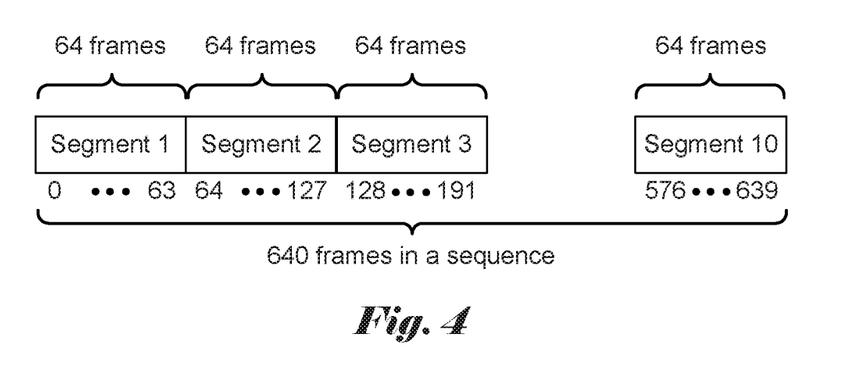
FIG. 4 illustrates an example of dividing frames into segments for NN processing, where the number of frames in a sequence is 640, and one set is defined as 64 successive frames in the display order.

In one embodiment, the frames in a sequence are partitioned into multiple sets/segments, and each set/segment includes K successive frames in the display order as shown in FIG. 3. The parameters of one NN network are trained for each set/segment in one sequence and the NN with the derived parameters is applied to the frames in the set/segment. For example, the number of frames in a sequence is 640, and one set (or a segment) is defined as 64 successive frames in the display order as shown in FIG. 4. Then the first set/segment includes the frames with the index range from 0 to 63, the second set/segment includes the frames with the index range from 64 to 127, the third set/segment includes the frames with the index range from 128 to 191, and so on. For each set/segment, one NN parameter set is derived to fit the characteristic of frames in this set/segment. The NN with the derived parameter set is applied to a target signal in one or more encoded frames of a target segment in the encoder side with the derived NN parameter set for the target segment and the derived NN parameter set is signaled. In order to further improve coding efficiency, not all of sets/segments are processed by NN. If NN is not applied on a target set/segment, the corresponding NN parameter set does not need to be signaled. In another embodiment, the K successive frames in the decoding order can be used for grouping frames into sets (i.e., segments) instead of the display order. In another embodiment, each set/segment is one random access segment (RAS) with one random access point in the segment.

Figure 5:
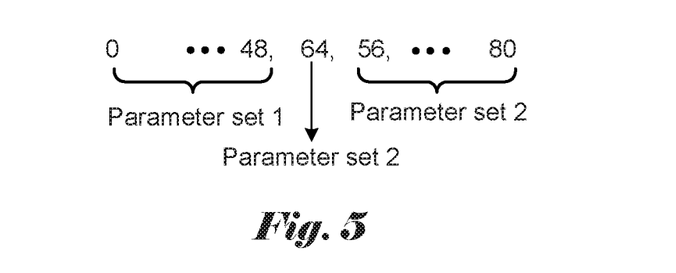
FIG. 5 illustrates an example of encoding order for a coding system using NN processing, where the coding order for a sequence with GOP (group of pictures) is equal.
Figure 6:
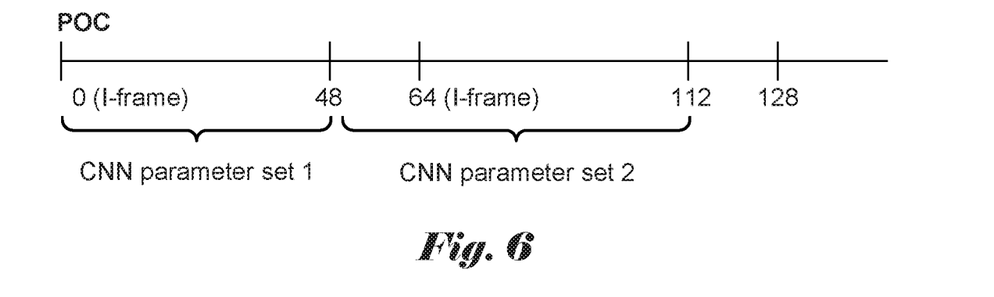
FIG. 6 illustrates one embodiment of NN processing, where the NN parameter sets are switched after decoding one random access point (i.e., frame 64 in this example).

FIG. 5 illustrates an example of encoding order for a coding system using NN processing. In this example, the coding order for a sequence with GOP (group of pictures) equal to 16 is shown. The random access point is inserted every 64 frames. As shown in FIG. 5, the encoder can encode input frames from frame 0 up to frame 48. The encoder then jumps to encode next random access point (i.e., frame 64) and then encode the frames between frames 48 to 64. In decoder side, the decoding order is the same as the encoding order. According to one embodiment, the NN parameter sets are switched after decoding one random access point (i.e., frame 64 in this example). The use of the NN parameter sets on the segments is shown in FIG. 6. As shown in FIG. 6, the NN parameter set 1 is applied to frame 0 through 48. The NN parameter set 2 is applied to frame 49 through frame 112. In this embodiment, after frames 0 to 48 are encoded or decoded, NN parameters set 1 is not needed any more since frames 49 to 112 use NN parameter set 2. Similarly, frames 113 to 176 use NN parameter set 3.

Figure 7:
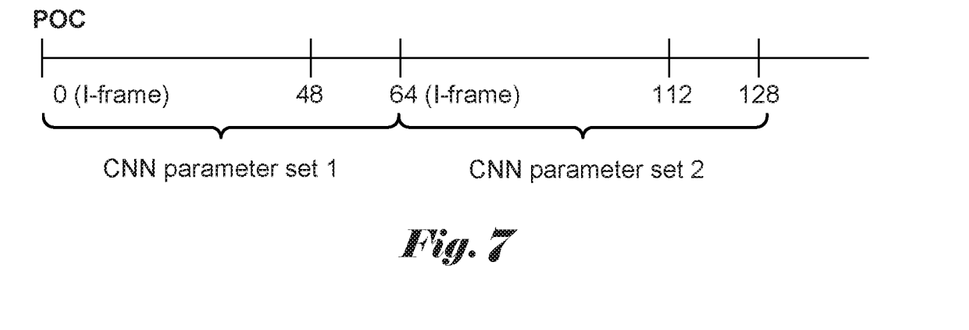
FIG. 7 illustrates another embodiment of NN processing, where the NN parameter sets are switched after the reference frame buffer is reset.

A video encoder can encode frames one by one sequentially or encode random access segments in parallel. If encoding random access segments in parallel is used, then one additional special process may be needed for the random access point to guarantee the encoding results in the sequential process and the parallel process are the same. For example, if the set is defined as one random access segment (RAS), then two derived CNN parameter sets will be needed when encoding a random access segment. FIG. 7 illustrates an example video coding using NN processing. The encoding order is the same as that in FIG. 5 with GOP (group of pictures) equal to 16. According to this embodiment, the reference frame buffer is reset after the segment has been encoded or decoded. In this case, the NN parameter sets are switched when the reference frame buffer is reset. Therefore, NN parameter set 1 is applied to frames 0 to 63, NN parameter set 2 is applied to frames 64 to 127, NN parameter set 3 is applied to frames 128 to 191, and so on. After decoding the first RAS, but before resetting the reference frame buffer, the old NN parameter set (i.e., NN parameter set 1) is still needed for the first RAS (in particular, frames 49 to 63). However, the random access point for the next segment (i.e., frame 64) is not available yet. NN can be disabled for random access points, or one or more predefined NN parameter sets can be used for random access points instead of derived NN parameter sets. Accordingly, only one NN parameter set is needed.

In one embodiment, NN can only be applied to a target signal in some specific frames. For example, NN can be only applied to the target signal in some specific frames which can be pre-defined or signaled at sequence level or picture level. Examples of specific frames may include:

reference frames, non-reference frames, frames with a specific temporal ID (the index of the temporal layer) range (e.g. less than a pre-defined threshold, larger than a pre-defined threshold, or a range between minimum and maximum value), frames coded with a specific QP range (e.g. less than a pre-defined threshold, larger than a pre-defined threshold, or a range between minimum and maximum values), slice types (intra slice, inter slice, bi-prediction slice, or uni-prediction slice), the first few inter frames right after the I-slice, or any combination of the above coding conditions.

Also, the NN can be applied to every k frames in the video sequence, or k frames selected from each temporal layer or from each QP setting.

In another embodiment, a frame in one sequences is partitioned into multiple regions, and each region includes N×M pixels, a CTU, N×M CTU, one or more CTU row, or whole frame. The parameters of one NN network are trained for each region in a frame and the NN with the derived parameters is applied on the regions in one frame. For each region, one NN parameter set is derived to fit the characteristic of frames in this region; the NN with the derived parameter set is applied and the derived NN parameter set is signaled. In order to further improve coding efficiency, not all of regions are processed by NN. If NN is not applied on one region, the corresponding NN parameter set is not required to be signaled. In one embodiment, one region can be processed by NN using the parameters derived from another region.

In one embodiment, the regions can share the whole or partial NN parameter set. For example, if the regions share a whole NN parameter set, the NN parameter set can be derived from one region and other regions can use the same NN parameter set. Therefore, only one derived NN parameter set needs to be signaled. If the regions share the partial NN parameter set, the NN parameter set can be derived from one region and other regions can use a derived NN parameter set partially from the fixed NN parameter set. In this case, one NN parameter set and the remaining NN parameter set not included in the partial NN parameter set are signaled. In some embodiments, the partial NN parameter sets could be used for the upper layers of NN while the fixed NN parameter set could be used for the lower layers or the remained layers of NN.

In one embodiment, the NN parameter set for a region can share with spatial neighboring region or temporal collocated regions. For example, a CTU can use NN parameter set from left CTU, top CTU, right CTU, bottom CTU, left-top CTU, right-top CTU, left-bottom CTU, or right-bottom CTU. For another example, a CTU can use NN parameter set at collocated CTU in another frame, or a frame can use NN parameter setoff another frames such as reference frames, previous decoded frames, or frames with the same temporal layer.

In one embodiment, the NN parameter set can be stored in a buffer with size N and used in the following region. For example, when one NN parameter set for a region is derived/decoded, the NN parameter set can be stored in the buffer. The following region can use the NN parameter set in the buffer, or the following region can derive/decode another NN parameter set and store it in the buffer. When the buffer is full, it can use replacement policies, such as FIFO (first in first out), LIFO (last in first out), or LRU (least recently used), etc., to replace NN parameter set in the buffer. In some embodiments, when the NN parameter set is derived from one region and other regions use a derived NN parameter set partially from the fixed NN parameter set, the fixed NN parameter set can be stored in the buffer or the NN parameter set (including the fixed NN parameter set) cane stored in the buffer.

The proposed methods disclosed above can be implemented in encoders and/or decoders. For example, the proposed method can be implemented in the in-loop filter module of an encoder, and/or the in-loop filter module of a decoder. Alternatively, any of the proposed methods can be implemented as a circuit coupled to the in-loop filter module of the encoder and/or the in-loop filter module of the decoder, so as to provide the information needed by the in-loop filter module.

Figure 8:
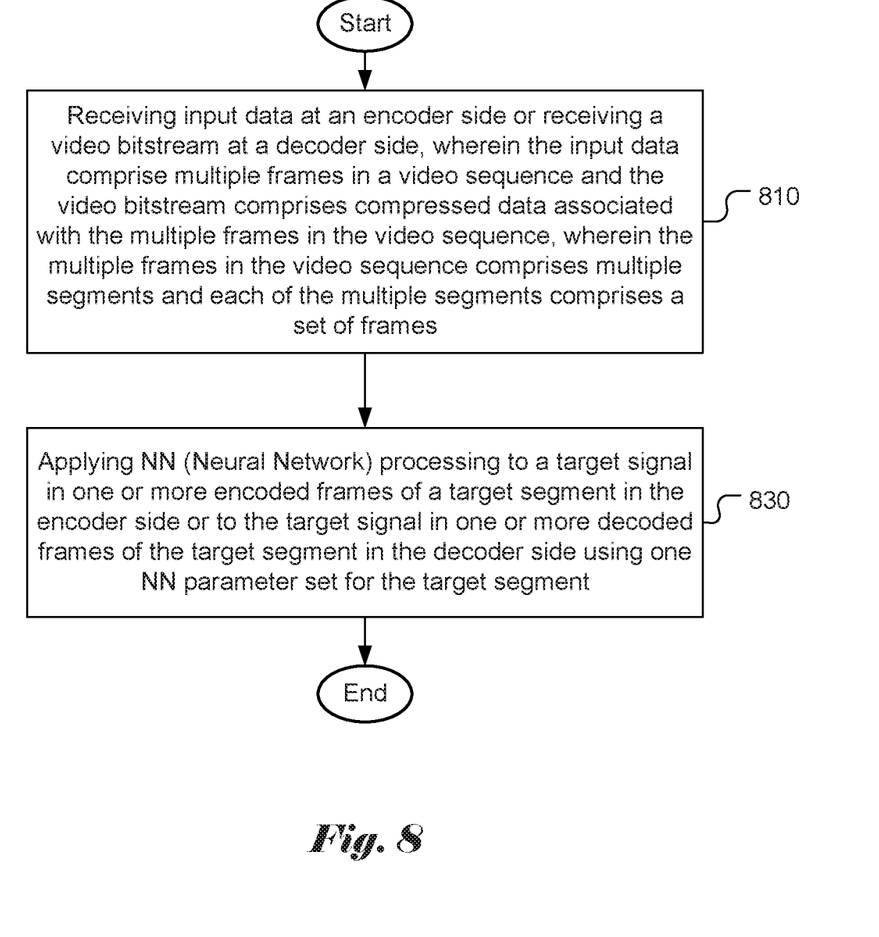
FIG. 8 illustrates an exemplary flowchart of video coding for a video encoder or decoder incorporating the neural network (NN) according to one embodiment of the present invention.

FIG. 8 illustrates an exemplary flowchart of video coding for a video encoder or decoder incorporating the neural network (NN) according to one embodiment of the present invention. The steps shown in the flowchart may be implemented as program codes executable on one or more processors (e.g., one or more CPUs) at an encoder side or decoder side. The steps shown in the flowchart may also be implemented based hardware such as one or more electronic devices or processors arranged to perform the steps in the flowchart. The method receives input data at an encoder side or receiving a video bitstream at a decoder side in step 810, where the input data comprise multiple frames in a video sequence and the video bitstream comprises compressed data associated with the multiple frames in the video sequence, wherein the multiple frames in the video sequence comprises multiple segments, wherein each of the multiple segments comprises a set of frames. The NN (Neural Network) processing is applied to a target signal in one or more encoded frames of a target segment in the encoder side or to the target signal in one or more decoded frames of the target segment in the decoder side using one NN parameter set for the target segment in step 830.

Figure 9:
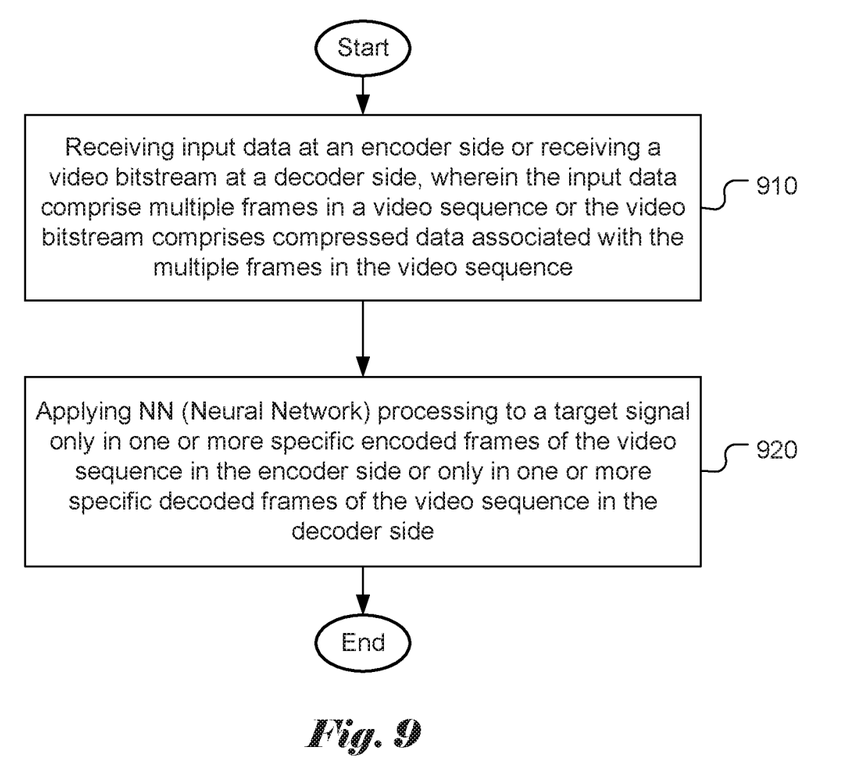
FIG. 9 illustrates an exemplary flowchart of video coding for a video encoder or decoder incorporating the neural network (NN) according to another embodiment of the present invention.

FIG. 9 illustrates an exemplary flowchart of video coding for a video encoder or decoder incorporating the neural network (NN) according to another embodiment of the present invention. According to this method, input data at an encoder side or receiving a video bitstream at a decoder side are received in step 910, wherein the input data comprise multiple frames in a video sequence or the video bitstream comprises compressed data associated with the multiple frames in the video sequence. The NN (Neural Network) processing is applied to a target signal only in one or more specific encoded frames of the video sequence in the encoder side or only in one or more specific decoded frames of the video sequence in the decoder side in step 920.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding for a video encoder or decoder, the method comprising:

receiving input data at an encoder side or receiving a video bitstream at a decoder side, wherein the input data comprise multiple frames in a video sequence and the video bitstream comprises compressed data associated with the multiple frames in the video sequence, wherein the multiple frames in the video sequence comprises multiple segments and each of the multiple segments comprises a set of frames; and applying NN (Neural Network) processing to a target signal in one or more encoded frames of a target segment in the encoder side or to the target signal in one or more decoded frames of the target segment in the decoder side using one NN parameter set for the target segment, wherein each of the multiple segments corresponds to one random access segment (RAS).

2. The method of claim 1, wherein the set of frames in each of the multiple segments corresponds to consecutive frame in a display order.

3. The method of claim 1, wherein the set of frames in each of the multiple segments corresponds to consecutive frame in a decoding order.

4. The method of claim 1, wherein information of one NN parameter set for one target segment is not signaled if the NN processing is not applied to said one target segment.

5. The method of claim 1, wherein the multiple frames comprises the multiple segments with a same number of frames in each of the multiple frames.

6. A method of video coding for a video encoder or decoder, the method comprising:

receiving input data at an encoder side or receiving a video bitstream at a decoder side, wherein the input data comprise multiple frames in a video sequence and the video bitstream comprises compressed data associated with the multiple frames in the video sequence, wherein the multiple frames in the video sequence comprises multiple segments and each of the multiple segments comprises a set of frames; and applying NN (Neural Network) processing to a target signal in one or more encoded frames of a target segment in the encoder side or to the target signal in one or more decoded frames of the target segment in the decoder side using one NN parameter set for the target segment, wherein for the video bitstream corresponding to multiple random access segments, an NN parameter set for a random access segment of the multiple random access segments is switched to a next NN parameter set for a next random access segment of the multiple random access segments after decoding one random access point of the random access segment of the random access segments from the video bitstream.

7. The method of claim 1, wherein for the video bitstream corresponding to multiple random access segments, an NN parameter set for a random access segment of the multiple random access segments is switched to a next NN parameter set for next random access segment of the multiple random access segments when a reference frame buffer is reset.

8. The method of claim 7, wherein the NN processing is disabled for random access points in the multiple random access segments.

9. The method of claim 7, wherein the NN processing is applied to random access points in the multiple random access segments using one or more pre-defined NN parameter sets.

10. The method of claim 1, wherein the target signal corresponds to reconstructed residual, reconstructed output, de-blocked output, SAO (sample adaptive offset) output, ALF (adaptive loop filter) output, or a combination thereof.

11. An apparatus for video coding in a video encoder or decoder, the apparatus comprising one or more electronics or processors arranged to:

receive input data at an encoder side or receiving a video bitstream at a decoder side, wherein the input data comprise multiple frames in a video sequence and the video bitstream comprises compressed data associated with the multiple frames in the video sequence, wherein the multiple frames in the video sequence comprises multiple segments; and apply NN (Neural Network) processing to a target signal in one or more encoded frames of a target segment in the encoder side or to the target signal in one or more decoded frames of the target segment in the decoder side using one NN parameter set for the target segment, wherein for the video bitstream corresponding to multiple random access segments, an NN parameter set for a random access segment of the multiple random access segments is switched to a next NN parameter set for a next random access segment of the multiple random access segments after decoding one random access point of the random access segment of the random access segments from the video bitstream.

12. A method of video coding for a video encoder or decoder, the method comprising:

receiving input data at an encoder side or receiving a video bitstream at a decoder side, wherein the input data comprise multiple frames in a video sequence or the video bitstream comprises compressed data associated with the multiple frames in the video sequence; and applying NN (Neural Network) processing to a target signal only in one or more specific encoded frames of the video sequence in the encoder side or only in one or more specific decoded frames of the video sequence in the decoder side, wherein for the video bitstream corresponding to multiple random access segments, an NN parameter set for a random access segment of the multiple random access segments is switched to a next NN parameter set for a next random access segment of the multiple random access segments after decoding one random access point of the random access segment of the random access segments from the video bitstream.

13. The method of claim 12, wherein said one or more specific encoded frames or said one or more specific decoded frames are pre-defined.

14. The method of claim 12, wherein said one or more specific encoded frames or said one or more specific decoded frames are indicated by one or more syntax elements signaled in a sequence level or a picture level.

15. The method of claim 12, wherein said one or more specific encoded frames or said one or more specific decoded frames correspond to one or more reference frames.

16. The method of claim 12, wherein said one or more specific encoded frames or said one or more specific decoded frames correspond to one or more non-reference frames.

17. The method of claim 12, wherein said one or more specific encoded frames or said one or more specific decoded frames correspond to one or more frames with a specific temporal layer or a range of temporal layers.

18. The method of claim 12, wherein said one or more specific encoded frames or said one or more specific decoded frames correspond to one or more frames coded with a specific QP range or with a target slice type.

19. The method of claim 12, wherein said one or more specific encoded frames or said one or more specific decoded frames correspond to one or more Inter frames immediately after an I slice.

20. The method of claim 12, wherein the target signal corresponds to reconstructed residual, reconstructed output, de-blocked output, SAO (sample adaptive offset) output, ALF (adaptive loop filter) output, or a combination thereof.

* * * * *